United States Patent [19]

Schoenherr et al.

[11] Patent Number: 5,579,065

[45] Date of Patent: Nov. 26, 1996

[54] PANORAMIC CAMERA WITH CONTROL DEVICE

[75] Inventors: Hans-Joerg Schoenherr; Hans Zimmet, both of Dresden, Germany

[73] Assignee: Kamerawerke Noble GmbH, Dresden, Germany

[21] Appl. No.: 502,939

[22] Filed: Jul. 17, 1995

[30] Foreign Application Priority Data

Jul. 15, 1994 [DE] Germany .......................... 44 24 982.9

[51] Int. Cl.⁶ .................................................. G03B 37/00
[52] U.S. Cl. .................................................. 396/22
[58] Field of Search .......................... 354/94–96, 98, 354/99; 352/69–71; 358/87; 378/38; 348/37, 65

[56] References Cited

U.S. PATENT DOCUMENTS

| | | |
|---|---|---|
| 2,764,073 | 9/1956 | Lin .............................................. 354/96 |
| 2,782,699 | 2/1957 | Vanderhooft ............................... 354/96 |
| 2,815,701 | 12/1957 | Back et al. ................................. 354/98 |
| 2,926,561 | 3/1960 | Keeble ..................................... 354/96 X |
| 3,832,046 | 8/1974 | Mecklenborg ............................. 352/69 |
| 4,431,289 | 2/1984 | Reinhardt ................................... 354/96 |
| 5,305,035 | 4/1994 | Schönherr et al. ......................... 354/96 |

FOREIGN PATENT DOCUMENTS 2447754  4/1976  Germany .

Primary Examiner—D. Rutledge
Attorney, Agent, or Firm—Michael J. Striker

[57] ABSTRACT

A panoramic camera has an objective drum, an electric motor which drives the objective drum and has a motor shaft, the electric motor being arranged axis-parallel to and at a distance from the objective drum and having a regulatable speed, a plurality of outputs having different speeds and connected with the motor shaft, and a plurality of intermediate outputs connecting the outputs selectively with the objective drum.

9 Claims, 4 Drawing Sheets

PANORAMIC CAMERA WITH CONTROL DEVICE

BACKGROUND OF THE INVENTION

The present invention relates generally to panoramic cameras with control devices.

More particularly, it relates to a panoramic camera with a control device for forming groups with different speeds for an objective drum which is driveable by an electric motor with electronically changeable speed.

Cameras of the above mentioned general type are known in the art. One of such cameras is disclosed for example in U.S. Pat. No. 4,431,289. In this camera different drum speeds are provided by changing the operational voltage for the electric motor. Therefore, different drum speeds can be obtained only in a limited range.

Another camera is disclosed in German Patent 2,447,754. Here different drum speeds are obtained both by changing the operational voltage of the electric motor as well as by alternating of reducing transmissions. With these features the photographer must deal with different reducing transmissions and gears are required in the camera body.

SUMMARY OF THE INVENTION

Accordingly, it is an object of the present invention to provide a panoramic camera with a control device, which avoids the disadvantages of the prior art.

More particularly, it is an object of the present invention to provide a panoramic camera of the above mentioned general type which has a simple construction and provides the possibility of speed changes for the objective drum within broader range.

In keeping with these objects and with others which will become apparent hereinafter, one feature of the present invention resides, briefly stated, in a panoramic camera of the above mentioned type, in which an electric motor is arranged axis-parallel to and at a distance from the objective drum and is turnable around a swinging axis parallel to a motor shaft against a coupling spring, and a plurality of driven outputs are connected with the output and include a high speed output and a low speed output, a first intermediate output for driving connection of the objective drum with the high speed output, a second intermediate output for driving connection of the objective drum with the low speed output, and a support lever on which the second intermediate output is rotatably supported and bringable to different operational positions, wherein in a first operational position the second intermediate output is released both from the objective drum and from the low speed output and in a second operational position the second intermediate output is brought in engagement with the objective drum and with the low speed output, and the electric motor is turnable against its coupling spring around the turning axis and is releasable with the high speed output from the first intermediate output.

In accordance with a preferable feature of the present invention, a switching drive unit is provided which is selectively turnable to one of the operational positions and has an arm which rotatably supports the support lever for the second intermediate drive unit and is pretensioned against the support lever by a spring in direction of engagement of the second intermediate output with the objective drum.

In accordance with a further feature of the present invention, the low speed output is connected with the electric motor through a reducing transmission.

In accordance with another embodiment, the coupling spring pretensions the electric motor in a coupling direction and an additional spring is associated with it so that it loads the electric motor to an operational position in which the second intermediate output is engageable both with the objective drum and with the low speed output against the second intermediate drive unit.

Preferably, in accordance with still another feature of the present invention, the low speed output and the high speed output are arranged coaxially with one another at opposite sides of the electric motor, and the intermediate output with the objective drum is bringable in engagement near its oppositely located end surfaces.

In accordance with still another feature of the present invention, the intermediate output is provided on its periphery with a friction rim composed of a material having a high friction coefficient for example rubber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
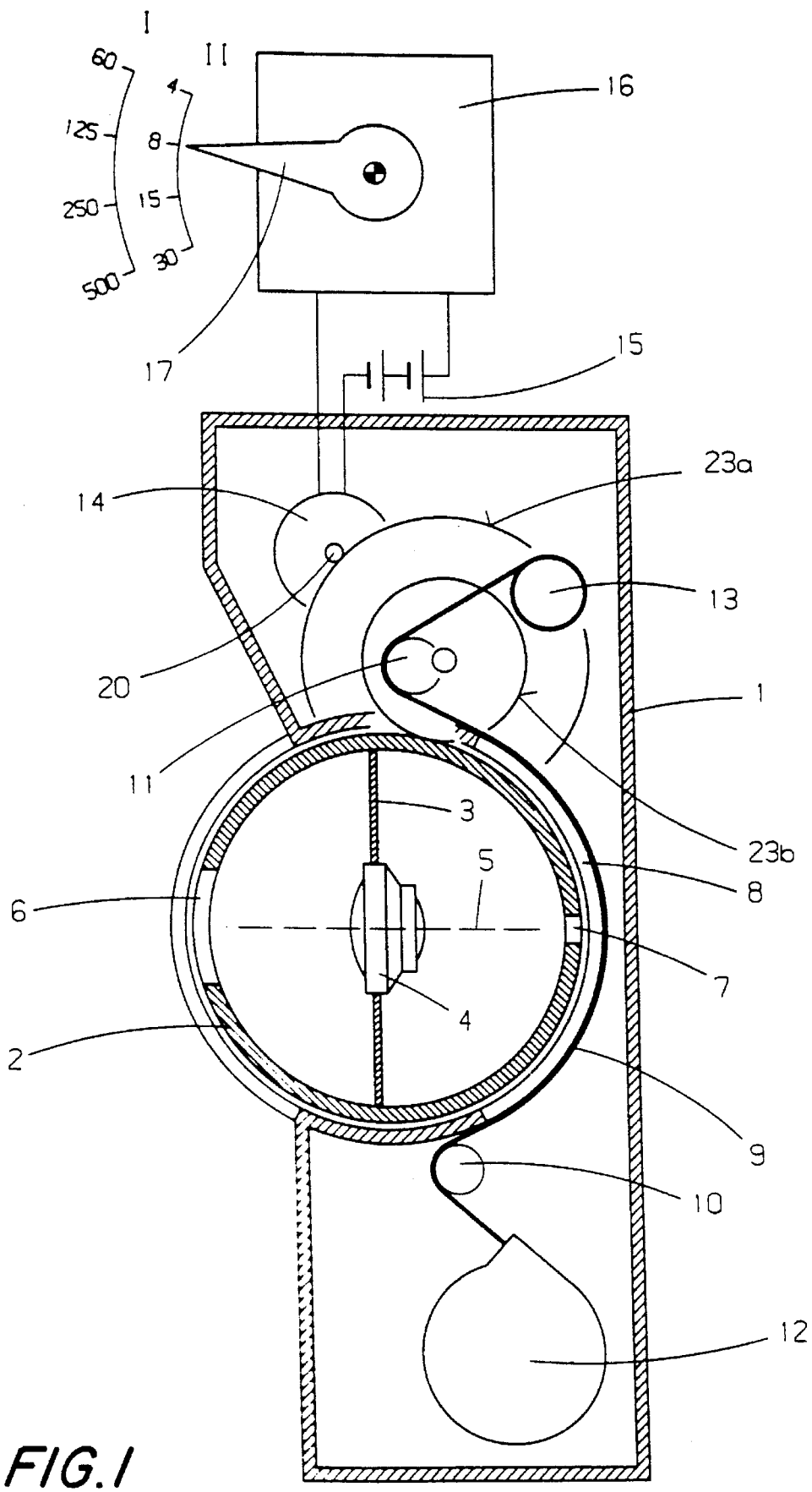
FIG. 1 is a view schematically showing a panoramic camera in accordance with the present invention.

A panoramic camera shown in FIG. 1 has a housing which is identified as a whole with reference numeral 1. An objective drum 2 is rotatably supported in the housing. A web 3 supports the objective drum 2, and an objective 4 is arranged on the web 3. A light inlet opening 6 and a light slot 7 are provided in correspondence with an optical axis 5 of the objective 4 in the objective drum 2 diametrically opposite to one another. An image window 5 is curved concentrically relative to the objective drum 2. A film 9 is located behind the image window 8. The film 9 is tensioned over deviating rollers 10 and 11 between a supply spool 12 and winding-on spool 13.

An electric motor 14 drives the objective drum 2. Operational voltage which is supplied to the electric motor 14 by a battery 15 is changeable by an electronic controller 16. An adjuster 17 of the controller 16 is moveable relative to scales I and II provided with numbers corresponding to values for illumination times.

Figure 2:
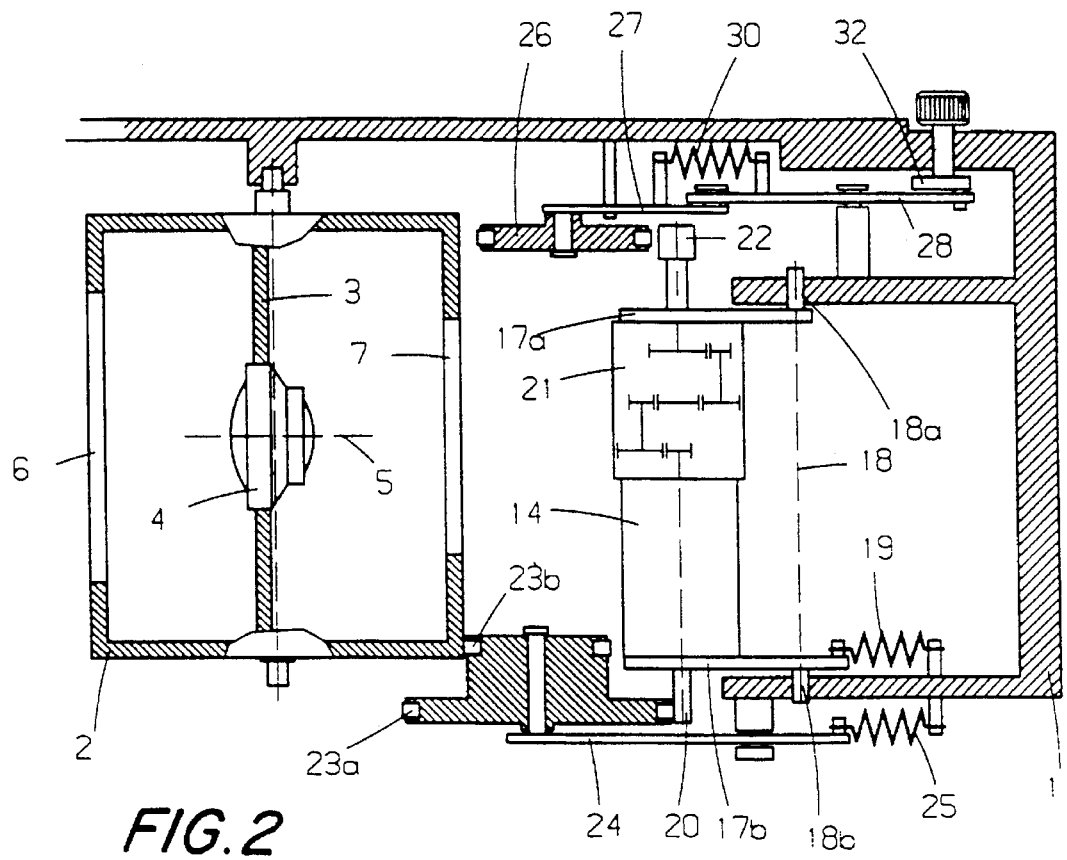
FIG. 2 is a side view of the inventive panoramic camera in a first operative position.
Figure 3:
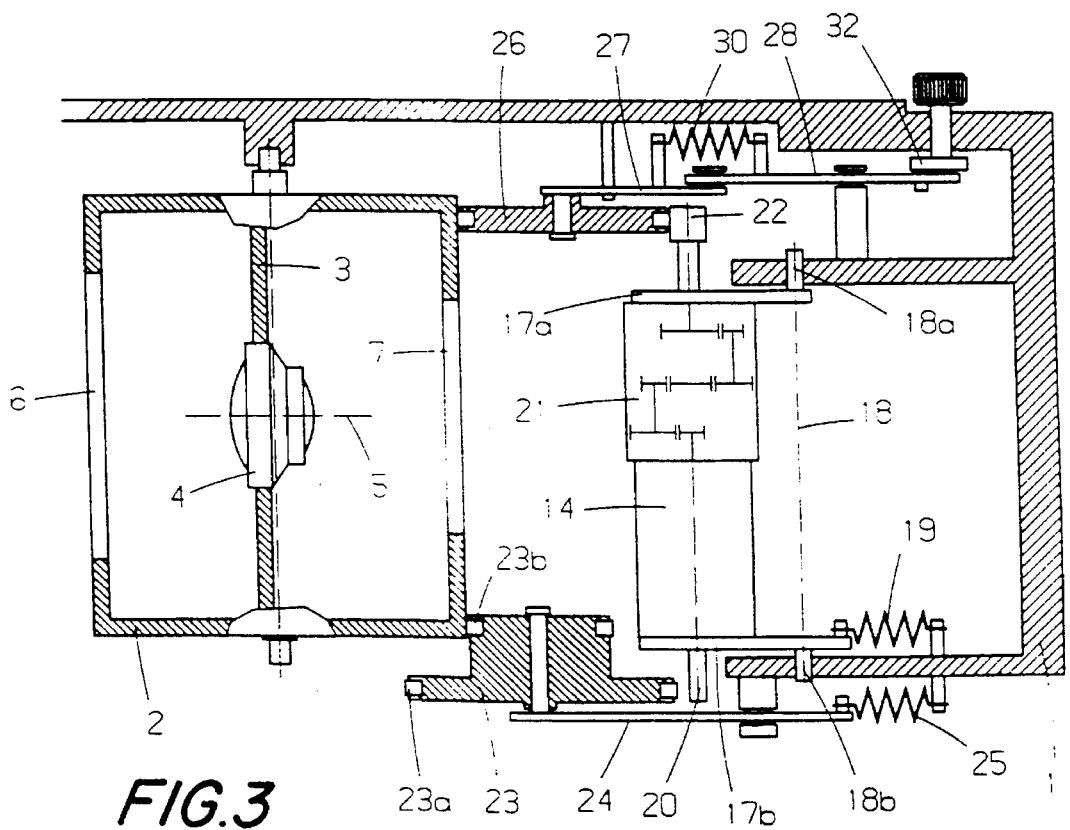
FIG. 3 is a side view of the inventive panoramic camera in a second operative position.

The electric motor 14 is supported on fork arms 17a and 17b turnably around a turning axis 18 by pins 18a and 18b, as shown in FIGS. 2 and 3. A free end of a coupling spring 19 which is anchored in the housing 1 of the camera is mounted on the fork arm 17b. The coupling spring biases the electric motor 14 in direction to engagement of its outputs with the intermediate outputs as will be described hereinbelow.

Figure 6:
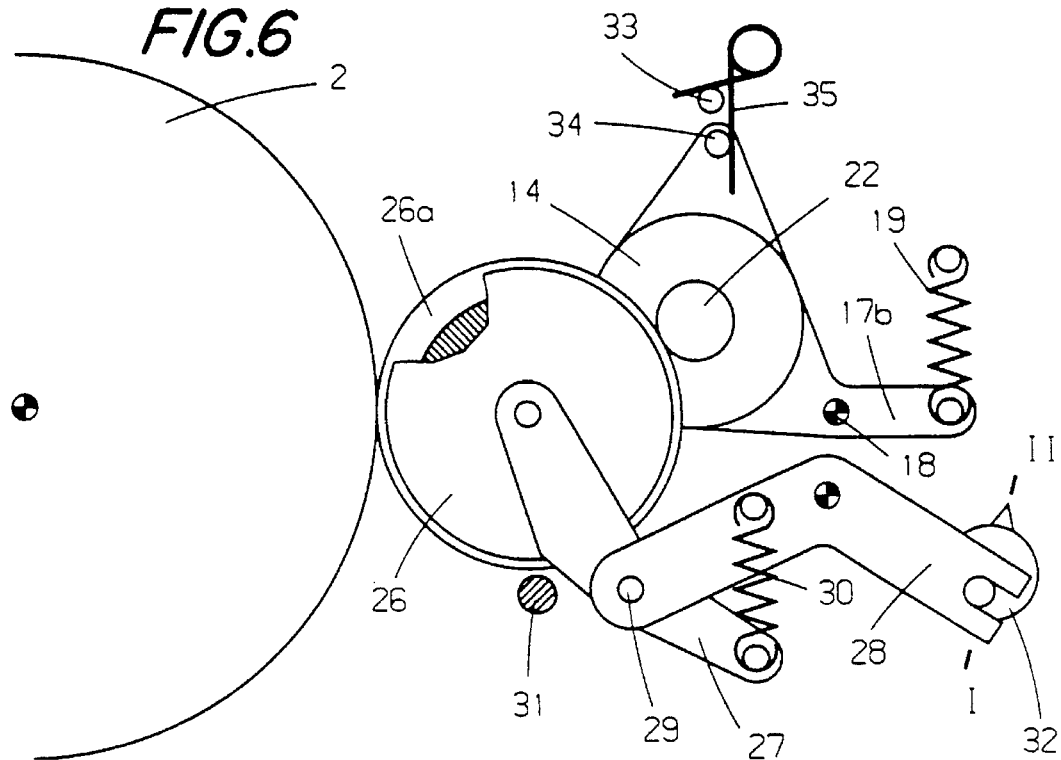
FIGS. 6 and 7 are views showing an enlarged plan view of the intermediate output in a second operational position.
Figure 7:
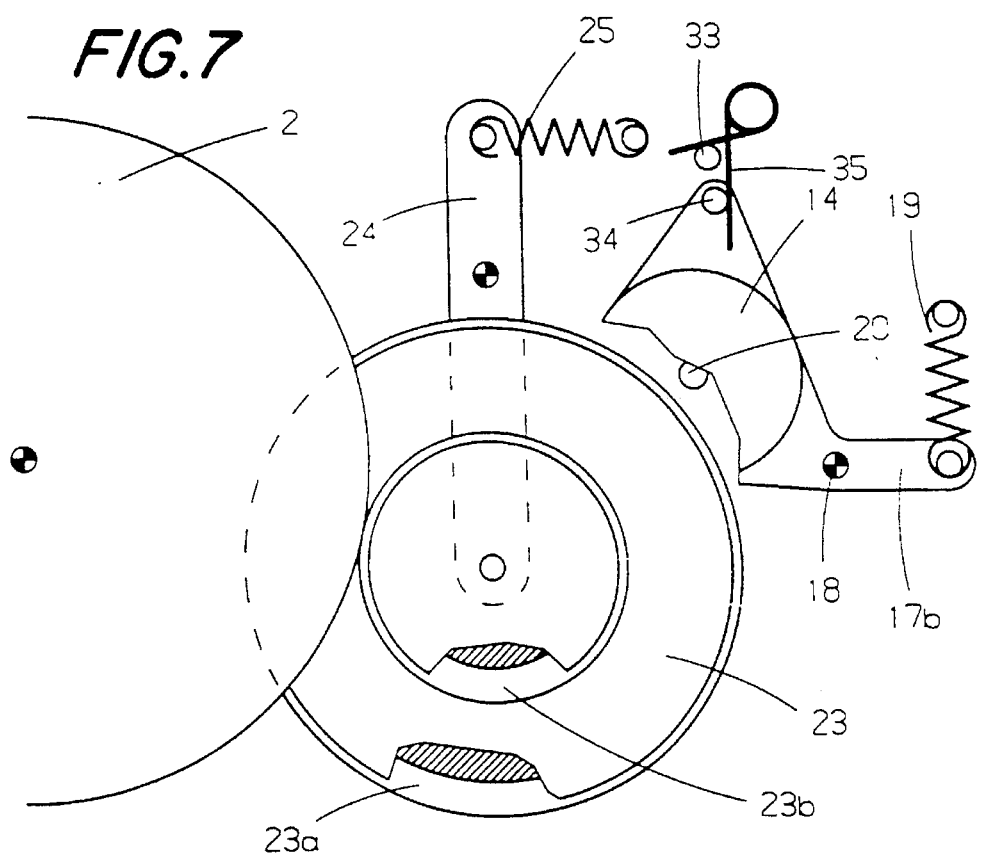

An auxiliary spring 35 is arranged near the coupling spring 19 and supports the coupling spring 19 in an upper part of its spring path. The free arm of the auxiliary spring 35 abuts in an immovable position against an abutment 33 which is fixed on the housing and can be lifted by the pin 35 of the fork arm 17b from the abutment 33 as seen in FIG. 6.

The outputs of the electric motor 14 include a high speed output 20 and a low speed output 22. The high speed output 20 is provided on the motor shaft extending from the lower side of the electric motor 14. At an axially opposite location, the motor shaft is connected through a reducing transmission 21 with the low speed output 22.

The intermediate output 23 is provided for driving connection of the high speed output with the objective drum 2. An intermediate output 23 is formed by wheels which are rigidly connected with one another and have different diameters, and also provided with friction rims 23a and 23b. The friction rims 23a and 23b are composed of a material which has a high friction coefficient, for example rubber. The greater wheel provided with the friction rim 23a can cooperate with the high speed output 20, while the smaller wheel provided with the friction rim 23b is in engagement with the objective drum 2. The intermediate output 23 is rotatably supported on a rocker 24. A spring 25 which engages the rocker 24 holds the intermediate output 23 with its smaller friction rim 23b in constant contact with the objective drum 22. The contact plane between the friction rim 23b and the objective drum 2 is located near its lower end surface.

An intermediate output 26 is provided for driving connection of the low speed output 22 with the objective drum 2. The periphery of the intermediate output 26 is provided with a friction rim 26a composed of a material having a high friction coefficient, for example rubber. The intermediate output 26 is rotatably supported on the supporting lever 27. The supporting lever is arranged on a switching lever 28 rotatably about a pin 29. The supporting lever 27 is prestressed by a pulling spring 30 against the switching lever 28 in direction of pressing of the intermediate output 26 against the objective drum 2 or an abutment 31 fixedly connected with the housing. The contact plane of the intermediate output 26 with the objective drum 2 is located near the upper end surface of the objective drum 2. The switching lever 28 is moveable by an eccentric 32 selectively into one of the operational positions I and II.

The arrangement in accordance with the present invention operates in the following manner:

For selecting different speeds of the electric motor 14, its operational voltage can be changed manually by turning the adjuster 17 of the controller 16. Thereby within one of the groups I and II the corresponding illumination times can be selected ont he concentric scales, and the objective drum 2 can be driven with different speeds by the electric motor 14. For selecting one of the groups of the illumination times, the eccentric 32 adjustable in the operational positions I and II is utilized.

Figure 4:
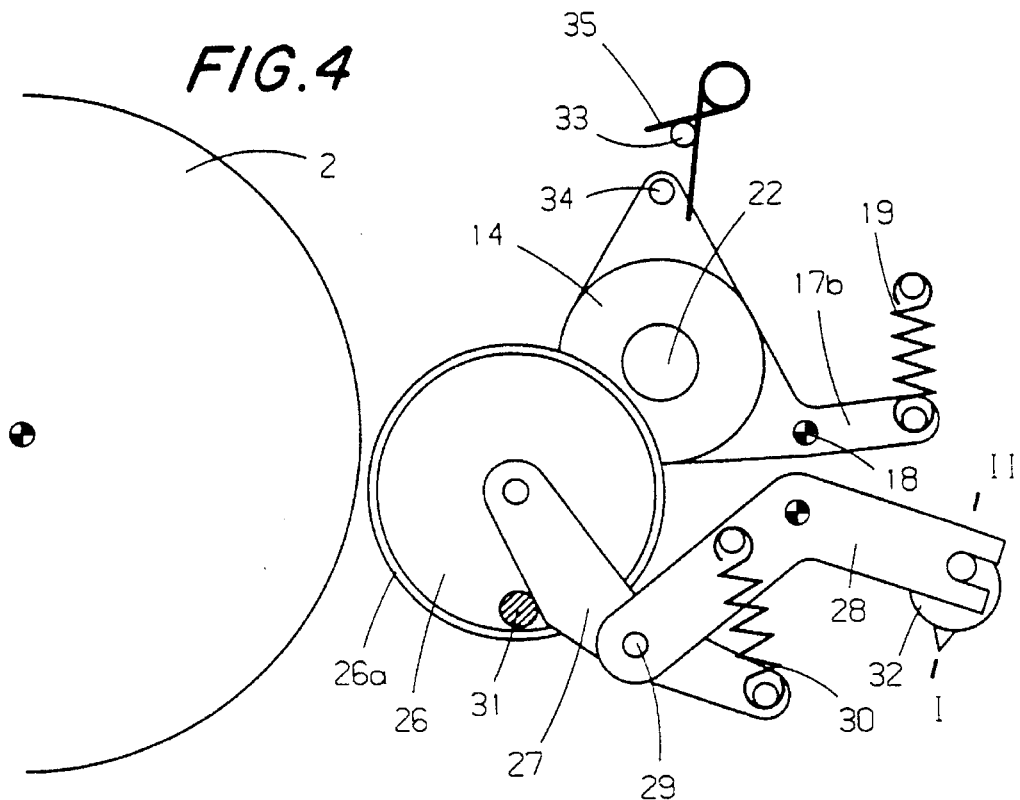
FIGS. 4 and 5 show an enlarged plan view of an intermediate output in a first operational position.
Figure 5:
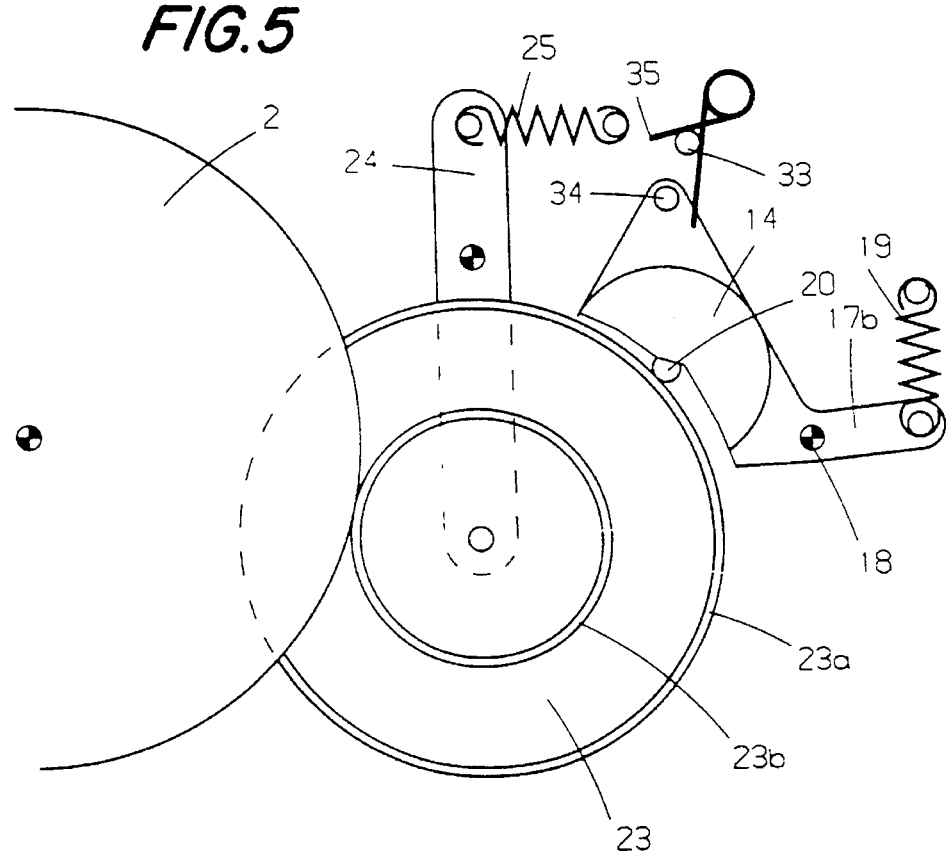

When the desired panoramic picture taking is performed with an illumination type of the group I or in another words with the utilization of the high speed output 20 for the rotation of the objective drum 2, the eccentric 32 is brought to the operational position I as shown in FIG. 4. In this position the switching lever 28 is turned in a counterclockwise direction so that the supporting lever 27 is released with contact of the housing-fixed abutment 38 of the second intermediate output 26 by the objective drum 2, and the low speed output 22 is withdrawn. With the withdrawal of the second intermediate output 26 from the low speed output 22, the coupling spring 19 is in the position to turn the electric motor 14 around the swinging axis 18 and to press the high speed output 20 against the friction rim 23a of the first intermediate output 23, as shown in FIG. 2. After abutting of the high speed output 20 against the friction rim 23a as shown in FIG. 5, the low speed output 22 arranged coaxially to the high speed output 20 cannot follow the deviating second intermediate output 26. The low speed output 22 as a result is blocked in the position released by the second intermediate output 26.

The friction coupling of the first intermediate output 23 with the objective drum 2 is performed near its lower end surface, and the required frictional pressure is supplied by the spring 25. The pressing of the high speed output 20 against the friction rim 23a of the first intermediate output 23 is taken over by the coupling spring 19. The auxiliary spring 33 associated with the coupling spring 25 is retained by the abutment 33 at a distance from the pin 34 of the fork arm 17b.

If the panoramic picture taking is performed with an illumination time of the group II, or in other words with the utilization of the low speed output 22, the eccentric 32 is brought to the operational position II as shown in FIG. 6. The switching lever 28 is turned in clockwise direction, and the supporting lever 27 is lifted from the abutment 31 and brought between the objective drum 2 as well as the low speed output 22 for frictional connection with the latter. The pressure required for the frictional connection of the second intermediate output 26 against the objective drum 2 is supplied near its upper end surface by the pulling spring 30.

By acting of the second intermediate output 26 on the low speed output 22, the latter together with the reducing transmission 21 and the electric motor 14 is turned against the coupling spring 19 as shown in FIG. 3. The pin 34 contacts the auxiliary spring 35 which is lifted from the abutment 35 and, additionally to the coupling spring 19, presses the fork arm 17b of the low speed output 22 against the second intermediate output 26. Simultaneously the high speed output 20 is disengaged from the first intermediate output 23, since the high speed Output 20 is lifted from the friction rim 23a.

When the panoramic camera is designed in accordance with the present invention, the photographer, without the exchange of the transmission parts, can make a selection between a plurality of illumination times during panoramic picture taking. The invention of course is not limited to the above described and illustrated example. Structural variations are possible. It is however important that the electric motor which drives the objective drum and is regulatable with respect to its rotary speed is located axis-parallel and turnable, and provided with several outputs with different speeds which are selectively connectable in a driving manner through intermediate outputs with the objective drum.

It will be understood that each of the elements described above, or two or more together, may also find a useful application in other types of constructions differing from the types described above.

While the invention has been illustrated and described as embodied in a panoramic camera with a control device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A panoramic camera, comprising an objective drum; an electric motor which drives said objective drum and has a motor shaft, said electric motor being arranged axis-parallel to and at a distance from said objective drum and having a regulatable speed; a plurality of outputs having different speeds and connected with said motor shaft; and a plurality of intermediate outputs connecting said outputs selectively with said objective drum.

2. A panoramic camera as defined in claim 1, wherein said outputs include a high speed output and a low speed output, said intermediate outputs including a first intermediate output which connects said objective drum with said high speed output, and a second intermediate output which connects said objective drum with said low-speed output.

3. A panoramic camera as defined in claim 2; and further comprising a coupling spring arranged so that said electric motor is turnable about a swinging axis extending parallel to said shaft of said motor against said coupling spring; a supporting lever on which said second intermediate output is rotatably supported and is bringable to different operational positions so that in a first one of said operational positions said second intermediate output is released both from said objective drum and said low speed output and in a second one of said operational positions said second intermediate output is engaged both with said objective drum and with said low speed output and said electric motor is turnable against said coupling spring around said swinging axis and said high speed output is releasable from said first intermediate output.

4. A panoramic camera as defined in claim 3; and further comprising a second spring; and a switching lever turnable selectively to one of said operating positions and having an arm on which said supporting lever for said second intermediate output is rotatably supported, said switching lever being pretensioned against said supporting lever by said second spring in direction of engagement of said second intermediate output with said objective drum.

5. A panoramic camera as defined in claim 2; and further comprising a reducing transmission through which said low speed output is connected with said electric motor.

6. A panoramic camera as defined in claim 2; and further comprising an auxiliary lever associated with said coupling lever which pretensions said electric motor in a coupling direction, said auxiliary lever loading said electric motor to other operational positions in which said second intermediate output is in engagement both with said objective drum and with said low speed output.

7. A panoramic camera as defined in claim 2, wherein said low speed output and said high speed output are located coaxially with one another at opposite sides of said electric motor, said objective drum having opposite end surfaces, said intermediate outputs being engageable with said objective drum at said opposite end surfaces.

8. A panoramic camera as defined in claim 2, wherein said intermediate outputs are provided at their periphery with friction rims composed of a material having a high friction coefficient.

9. A panoramic camera as defined in claim 8, wherein said friction rims are composed of rubber.

\* \* \* \* \*